United States Patent Office 3,118,777
Patented Jan. 21, 1964

3,118,777
COMPOSITION FOR TREATING COMMINUTED MEAT
Robert M. Lauck and James W. Tucker, Park Forest, Ill., assignors to Stauffer Chemical Company, New York, N.Y., a corporation of Delaware
No Drawing. Filed Mar. 14, 1961, Ser. No. 95,508
11 Claims. (Cl. 99—222)

This invention relates to compositions containing an alkali metal-trivalent metal phosphate and an alkali metal polyphosphate, the treating of meat products with an alkali metal-trivalent metal phosphate alone or in conjunction with an alkali metal polyphosphate, and meat products produced from such treatment.

In the processing of cured (e.g., cured with salt such as sodium nitrite) and uncured meat products (e.g., meats used in sausages, bologna, wieners, lunch meats, chopped ham, beef, hamburger, etc.), the meat product should (1) be bound together to form a coherent substantially homogeneous product that may be easily cut and handled without crumbling, (2) retain a high percentage of its fat content and water during cooking, thereby increasing the amount of salable product, (3) retain the desired color characteristics or have them restored and have improved flavor, and (4) have a controllable pH so as to enable it to retain or increase resistance to bacteriological spoilage and also acquire an improved color. The presently known materials and methods for processing such meat products are not entirely satisfactory in all these respects.

Tetrasodium pyrophosphate is known to be one of the more effective ingredients for treating comminuted (e.g., ground) meat products in order to prevent undue loss of weight during the cooking and smoking of meat products. However, tetrasodium pyrophosphate has different fat binding properties with meat products because of the variations in pH, amount of fat, and the time lapse between the slaughtering of the animal and the processing of the meat. On the other hand, it has the fault of raising the pH of the meat. This increases the tendency of the meat to become susceptible to bacterial deterioration as well as the consequent loss of desirable taste and color properties. This is particularly true with meat products having a high initial pH value. In some cases wherein the meat has a high initial pH, the high level of alkali metal polyphosphate required to effect a high degree of binding of the meat causes the meat to acquire an excessively high pH.

Meat products are known to vary in pH over an appreciable range depending on a number of factors such as the type of animal from which it is taken, degree of excitement of the animal before slaughter, type of feed used for the animal, etc.

We have now found that disadvantages commonly associated with alkali metal polyphosphates such as tetrasodium pyrophosphate may be substantially overcome and a superior meat product produced by the use of an alkali metal-trivalent metal phosphate, either alone or in conjunction with an alkali metal polyphosphate.

We have discovered that when certain cured or uncured, fresh or previously frozen, comminuted meat products are treated with an alkali metal-trivalent metal phosphate, the pH of the meat product tends to decrease the amount of free-run-off of juice (i.e., cook loss) from the cooked meat tends to decrease. A low free run-off of juice (low cook loss) indicates that the phosphate effectively binds fats and water. Further, when an alkali metal-trivalent metal phosphate is used in conjunction with an alkali metal polyphosphate (i.e., the two phosphate products may be added to certain meat products separately or together), they act synergistically, and the pH of the meat is decreased to values below those obtained with the alkali metal polyphosphate alone, particularly as the level of alkali metal-trivalent metal phosphate is increased, and the cook loss is decreased below the values obtained without either of the phosphates and, in some or many cases, below the values obtained with the alkali metal polyphosphate alone, particularly as the level of alkali metal polyphosphate is increased. The alkali metal-trivalent metal phosphate, when used either alone or in conjunction with the alkali metal polyphosphate, permits the control of the pH of the comminuted meat products at or near their optimum pH values, which causes the meat to be less susceptible to bacteriological deterioration and to have improved appearance and taste.

The minimum and maximum levels of phosphate (i.e., alkali metal-trivalent metal phosphate either alone or in conjunction with alkali metal polyphosphate) that should be added to the meat product is largely determined by the nature and quality of the meat and the particular properties that are desired. We have found that particularly satisfactory results are obtained when about 0.1% to about 8.0% (based on the entire composition of the treated meat) phosphate (i.e., alkali metal-trivalent metal phosphate either alone or in conjunction with alkali metal polyphosphate) is incorporated in the meat product. In particular, we find that a preferred range of phosphate is from 0.1% to 1.0% on the same basis as noted above. When both an alkali metal-trivalent metal phosphate and alkali metal polyphosphate are added to the meat product, either separately or together, we have found that particularly good results are obtained when they are added to the meat in a ratio of about 1 to about 5 parts alkali metal polyphosphate to about 1 part alkali metal-trivalent metal phosphate. Mixtures containing as much as 10 to 15 parts alkali metal polyphosphate per 1 part of alkali metal-trivalent metal phosphate have been used satisfactorily, however.

Since alkali metal polyphosphates are known to be effective in treating some meats, and since alkali metal-trivalent metal phosphates may be used as the sole meat treating composition, the basic concept of this invention lies in the use of an amount of alkali metal-trivalent metal phosphate which is effective to produce the desired result in the particular meat being treated. For the purposes of this invention, an effective amount is defined as that amount of alkali metal-trivalent metal phosphate which, when added to an alkali metal polyphosphate used for meat treating, will produce an improvement in cook loss and/or pH control.

The alkali metal-trivalent metal phosphate which we have found to be effective is a complex, acidic, soluble compound which may be represented generally by the formula $MM'_{3-4}H_{11-17}(PO_4)_{7-10} \cdot 0-8H_2O$, wherein M is a member of the class consisting of sodium, potassium and ammonium and M' is a trivalent metal atom of the class consisting of iron and aluminum. This complex may be either crystalline or amorphous in nature. One satisfactory form of this product is the crystalline compound of the formula $MM'_3H_{14}(PO_4)_8 \cdot 4H_2O$ which is disclosed in U.S. Patent 2,550,490. Further, various dehydrated modifications of this product containing from zero to four moles of hydrate water have also been found to be satisfactory. For example, U.S. Patent 2,957,750 discloses sodium aluminum phosphate having the empirical formula $NaAl_3H_{14}(PO_4)_8$ and zero to one mole of crystal water. This dehydrated product is produced by heating $NaAl_3H_{14}(PO_4)_8 \cdot 4H_2O$ at about 80°–200° C. until more than three moles of crystal water are removed without effecting molecular dehydration to produce a dehydrated product having a rearranged crystal lattice.

An amorphous form of this alkali metal-trivalent metal phosphate product having the empirical formula $$NaAl_3H_{11}(PO_4)_7 \cdot 5\text{–}8(H_2O)$$

has also been found satisfactory. U.S. patent application Serial No. 860,191, filed December 17, 1959, now U.S. Patent 2,995,421, describes this product. This product gives a blank powder X-ray diffraction pattern which indicates its amorphous nature. Since it cannot be crystallized and thus purified for further characterization, the above formula is only an empirical representation based upon analytical data.

Other alkali metal-trivalent metal phosphate materials may also be used, such as represented by the formulas: $NaAl_4H_{17}(PO_4)_{10} \cdot 5H_2O$; $NaAl_3H_{14}(PO_4)_8 \cdot 6H_2O$;

$$NaAl_3H_{17}(PO_4)_9 \cdot 6H_2O$$
$$KAl_3H_{14}(PO_4)_8 \cdot 5H_2O$$
$$KFe_4H_{26}(PO_4)_{13} \cdot 3H_2O$$
$$NH_4Al_3H_{14}(PO_4)_8 \cdot 5H_2O$$

and $NaFe_3H_{16}(PO_4)_9 \cdot 3H_2O$. It is difficult to positively identify such complex compounds.

We have found, however, for purpose of this invention that all of the above products may be incorporated into comminuted meat products to produce or induce the desired properties. Thus, the term alkali metal-trivalent metal phosphate (ATP) is intended to relate to all phosphates falling within the generic formula $$MM'_{3-4}H_{11-17}(PO_4)_{7-10} \cdot 0\text{—}8H_2O$$

The alkali metal polyphosphates which are suitable for this invention are the alkali metal pyro- and tripolyphosphates. Tetrasodium pyrophosphate, tetrapotassium pyrophosphate and sodium tripolyphosphate are of particular importance. These compounds are commercially readily available and the regular foodgrade product is satisfactory.

The alkali metal-trivalent metal phosphate, either alone or in conjunction with an alkali metal polyphosphate may be used in cured or uncured, fresh or previously frozen, comminuted meat products such as the comminuted meat products that are used in sausages, bologna, weiners, lunch meats, chopped ham, beef, hamburger, etc.

In the tests that are summarized in the following tables, the following abbreviations are used:

ATP—Alakali metal-trivalent metal phosphate
SAP—Sodium aluminum phosphate
TSPP—Tetrasodium pyrophosphate
TKPP—Tetrapotassium pyrophosphate
KMP—Potassium polymetaphosphate
STPP—Sodium tripolyphosphate
KAP—Potassium aluminum phosphate
SIP—Sodium iron phosphate
KIP—Potassium iron phosphate
AmAP—Ammonium aluminum phosphate In the tests that are shown in the following tables, the samples of meat emulsion were prepared as follows: a mixture was first made up containing 26.2% lard, 60% lean meat, 1% salt and 12.8% water. This mixture was homogenized, with or without phosphate salts, in a Waring Blendor for one-half minute at low speed and then for one minute at high speed. After refrigeration, the resulting emulsions were then cooked at 200° F. for nine minutes in centrifuge tubes by rolling steam. The juice was then poured freely from the cooked meat. This free run-off from the cooked meat was considered as the cook loss. The cook loss values shown in the tables are average values made from at least two determinations for each sample of meat emulsion.

The cured samples were prepared by adding 1% of curing salt to the above mixture. This curing salt was composed of 30 grams of sodium chloride and 1 gram of sodium nitrite. The curing salt provided a sodium nitrite concentrate of approximately 320 parts per million.

Briefly, the test data set forth in the following tables show that: the use of any one of TSPP, STPP and TKPP with comminuted meat causes the pH of meat products to increase and the cook loss to decrease; the use of SAP alone causes the pH of meat products to decrease below the values obtained when no phosphate additive is used; the use of any one of TSPP, TKPP, and STPP in conjunction with SAP generally decreases the pH of meat products to values below those obtained with the alkali metal polyphosphate alone, particularly as the level of SAP increases, and the cook loss decreases below the values obtained without either phosphate, and, in most cases, below the values obtained with the alkali metal polyphosphate alone; and the use of TSPP in conjunction with any one of KAP, KIP, SIP, and AmAP, decreases the cook loss of meat products below the values obtained when neither phosphate was used, and generally decreases the pH of meat products below the values obtained with TSPP alone.

The use of TSPP alone decreases the cook loss of the ground cured beef and increases the pH in the tests shown in Table I, particularly as the level of TSPP was increased. When TSPP was used with SAP, the pH decreased below the values that were obtained with TSPP alone, particularly as the level of SAP was increased. This combination caused the cook loss to decrease below the value obtained when no additive was used, particularly as the level of TSPP was increased. The minimum cook loss values were obtained when the ratio of SAP:TSPP was about 1:2.5 to 1:3.5. The pH of the meat treated with a 1:1 proportion of SAP:TSPP was about the same as the untreated meat.

TABLE I

*Use of TSPP and TSPP Plus SAP With Cured Ground Beef* [1]

| Percent SAP | Percent TSPP | | | | | | | |
|---|---|---|---|---|---|---|---|---|
| | 0 | | .15% | | .25% | | .35% | |
| | Percent Cook Loss | pH | Percent Cook Loss | pH Cooked | Percent Cook Loss | pH Cooked | Percent Cook Loss | pH Cooked |
| 0.00 | 48 | 6.17 | 45 | 6.39 | 38 | 6.59 | 25 | 6.70 |
| 0.03 | ---- | ---- | 42 | 6.32 | ---- | ---- | ---- | ---- |
| 0.05 | ---- | ---- | 20 | 6.23 | 39 | 6.49 | 35 | 6.62 |
| 0.10 | ---- | ---- | 43 | 6.21 | 39 | 6.49 | 23 | 6.59 |
| 0.15 | ---- | ---- | 43 | 6.19 | 38 | 6.38 | 32 | 6.48 |
| 0.20 | ---- | ---- | 41 | 6.08 | ---- | ---- | ---- | ---- |
| 0.25 | ---- | ---- | 45 | 5.99 | 38 | 6.20 | ---- | ---- |

[1] Previously frozen and then thawed overnight prior to cooking.

The use of TSPP alone in the tests shown in Table II caused the pH of the cured beef product to increase and the cook loss to decrease. The use of TSPP with SAP caused the pH of the meat to decrease below the values that were obtained with TSPP alone, particularly when the level of SAP was increased. The pH of meat treated with a 1:1 proportion of SAP:TSPP was about the same as the untreated meat.

TABLE II

*Use of TSPP and TSPP Plus SAP With Cured Beef Product*

| Phosphate Added | Meat Sample 1 | | Meat Sample 2 | |
|---|---|---|---|---|
| | Cook Loss | pH Cooked | Cook Loss | pH Cooked |
| 1. No phosphate | 46.0 | 6.08 | 42.0 | 5.89 |
| 2. 0.25% TSPP | 2.2 | 6.41 | 3.2 | 6.23 |
| 3. 0.25% TSPP, 0.10% SAP | 1.4 | 6.22 | 1.5 | 6.18 |
| 4. 0.25% TSPP, 0.25% SAP | 2.2 | 6.08 | 13.3 | 5.99 |

The use of TSPP alone in the tests shown in Table III caused the pH of the raw and cooked uncured beef to increase and the cook loss of the meat to decrease. The use of TSPP alone gave the meat a soapy flavor. When SAP was added to TSPP, the pH of the raw and cooked meat decreased below the values obtained with TSPP alone, and the cook loss of the meat decreased to a value that was slightly lower than the value that was obtained with TSPP alone and markedly lower than the value obtained when no additive was used. The use of TSPP plus SAP improved the flavor of the meat.

TABLE III

*Use of TSPP and TSPP Plus SAP With Uncured Beef*

| Phosphate Added | pH | | Percent Cook Loss |
|---|---|---|---|
| | Raw | Cooked | |
| 1. No phosphate | 6.25 | 6.28 | 47.0 |
| 2. 0.37% TSPP | 6.62 | 6.68 | 1.5 |
| 3. 0.37% TSPP, 0.13% SAP | 6.30 | 6.30 | 0.1 |

The use of TSPP alone in the tests shown in Table IV caused the pH of the raw and cooked, cured ⅓ pork–⅔ beef mixture to increase and the cook loss to decrease. The use of the combination of TSPP and SAP caused the pH of the raw and cooked meat to decrease below the values obtained with TSPP alone, particularly when the level of SAP in the combination was increased. The combination also caused the cook loss to decrease significantly below the value obtained when no additive was used.

TABLE IV

*Use of TSPP and TSPP Plus SAP With Cured Sausage [1]*

| Phosphate Added | pH | | Percent Cook Loss |
|---|---|---|---|
| | Raw | Cooked | |
| 1. No phosphate | 6.00 | 6.16 | 44 |
| 2. 0.25% TSPP | 6.39 | 6.50 | 1 |
| 3. 0.25% TSPP, 0.10 %SAP | 6.31 | 6.39 | 4 |
| 4. 0.25% TSPP, 0.17 %SAP | 6.29 | 6.20 | 6 |
| 5. 0.25% TSPP, 0.25 %SAP | 6.21 | 6.17 | 2 |

[1] ⅔ beef and ⅓ pork.

The use of TSPP alone in the tests shown in Table V caused the pH of the raw and cooked, cured ground pork to increase and the cook loss to decrease. The combination of TSPP and SAP generally caused the pH of the raw and cooked meat to decrease below the values obtained with TSPP alone, particularly when the level of SAP in the combination was increased. The combination also caused the cook loss to decrease significantly below the value obtained when no additive was used. There was a particularly good improvement in flavor when equal parts by weight of TSPP and SAP were used in place of TSPP alone.

TABLE V

*Use of TSPP and TSPP Plus SAP With Cured Ground Pork [1]*

| Phosphate Added | pH | | Percent Cook Loss |
|---|---|---|---|
| | Raw | Cooked | |
| 1. No phosphate | 6.01 | 6.20 | 52.4 |
| 2. 0.25% TSPP | 6.39 | 6.42 | 13.4 |
| 3. 0.25% TSPP, 0.05% SAP | 6.39 | 6.30 | 12.9 |
| 4. 0.25% TSPP, 0.10% SAP | 6.23 | 6.23 | 9.2 |
| 5. 0.25% TSPP, 0.16% SAP | 6.23 | 6.15 | 6.1 |
| 6. 0.25% TSPP, 0.25% SAP | 6.18 | 6.10 | 18.0 |

[1] Previously frozen and then thawed overnight prior to cooking.

The use of TSPP alone in the tests shown in Table VI caused the pH of the raw and cooked, uncured beef to increase and the cook loss to decrease. The use of SAP alone caused the pH of the raw and cooked meat to decrease to values that were lower than those obtained either with TSPP alone or without an additive, and the cook loss to drop slightly below the value obtained with untreated meat. The combination of TSPP and SAP caused the meat to have the lowest cook loss, thus showing the synergistic properties of the combination, and caused the pH of the meat to decrease below the values that were obtained with TSPP alone and with no additive.

TABLE VI

*Use of TSPP Alone, SAP Alone, and TSPP Plus SAP With Uncured Beef*

| Basic Formula | pH | | Percent Cook Loss |
|---|---|---|---|
| | Raw | Cooked | |
| 1. No phosphate | 6.76 | 6.88 | 39 |
| 2. 0.42% TSPP | 6.83 | 7.12 | 25 |
| 3. 0.14% SAP | 6.44 | 6.34 | 33 |
| 4. 0.42% TSPP, 0.14% SAP | 6.70 | 6.72 | 18 |

The use of TSPP alone in the tests shown in Table VII caused the pH of the uncured beef to increase and the cook loss to decrease. The use of SAP alone caused the pH of the uncured meat to decrease to a value that was lower than that obtained with TSPP alone and with no additive, and the cook loss to drop slightly below the value obtained with untreated meat. The combination of TSPP and SAP caused the meat to have a cook loss that was lower than the values obtained with no additive, with TSPP alone, and with SAP alone. The pH of the meat with TSPP-SAP combination reached a value below that obtained with TSPP alone. The TSPP-KPM combination caused the meat to have a greater cook loss and lower pH value than were obtained with TSPP alone. The TSPP-KPM combination caused the meat to have a greater pH value and markedly greater cook loss than were obtained with the combination of TSPP-SAP, but the pH value was lower than that obtained with TSPP alone.

TABLE VII

*Use of TSPP Alone, SAP Alone, and TSPP Plus SAP With Uncured Beef*

| Phosphate Added | Percent Cook Loss | pH-Cooked |
|---|---|---|
| 1. No phosphate | 47 | 6.22 |
| 2. 0.15% TSPP | 38 | 6.50 |
| 3. 0.05% SAP | 45 | 6.10 |
| 4. 0.15% TSPP, 0.05% SAP | 4 | 6.45 |
| 5. 0.15% TSPP, 0.05% KPM | 39 | 6.48 |

The use of TSPP alone and TKPP alone in the tests shown in Table VIII, cause the pH of the cooked cured beef to increase and cook loss to decrease. The cook loss and pH change that was effected by TSPP alone was the same as that obtained with TKPP alone. The combination of TKPP and SAP caused the pH of the meat to increase but below the value that was obtained with TKPP alone. This combination caused the meat to have a low cook loss, lower than the values obtained with TKPP alone and with no additive. The combination of TSPP and SAP caused the pH to increase, but to a value below that obtained with TSPP alone and with the TKPP-SAP combination. The TSPP-SAP combination caused the meat to have a cook loss value that was below those obtained with no additive and with TSPP alone.

TABLE VIII

*Use of TSPP Alone, TKPP Alone, TSPP Plus SAP and TKPP Plus SAP With Cured Beef*

| Phosphate Added | pH-Cooked | Percent Cook Loss |
|---|---|---|
| 1. No phosphate | 6.15 | 48 |
| 2. 0.15% TSPP | 6.39 | 42 |
| 3. 0.15% TKPP | 6.39 | 42 |
| 4. 0.15% TSPP, 0.05% SAP | 6.23 | 20 |
| 5. 0.15% TKPP, 0.05% SAP | 6.31 | 10 |

The use of STPP alone in the tests shown in Table IX caused the pH of the raw and cooked cured ground beef to increase and the cook loss to decrease. The combination of STPP and SAP caused the pH of the meat to decrease below the values obtained with STPP alone, especially in test 5 wherein the level of SAP was increased. The combination caused the cook loss to decrease significantly below that obtained when no additive was used and to decrease slightly below the value obtained with STPP alone.

TABLE IX

*Use of STPP and STPP Plus SAP With Cured Ground Beef*

| Phosphate Added | pH Raw | pH Cooked | Percent Cook Loss |
|---|---|---|---|
| 1. No phosphate | 6.43 | 6.28 | 53.2 |
| 2. 0.33% STPP | 6.62 | 6.65 | 44.2 |
| 3. 0.33% STPP, 0.15% SAP | 6.38 | 6.51 | 43.4 |
| 4. 0.33% STPP, 0.25% SAP | 6.35 | 6.42 | 43.5 |
| 5. 0.33% STPP, 0.33% SAP | 6.21 | 6.30 | 41.0 |

The use of TSPP alone in the tests shown in Table X caused the pH of raw and cooked cured ground beef to increase and the cook loss to decrease. When TSPP was used in conjunction with one of (a) KAP, (b) KIP, (c) SIP, and (d) AmAP, the cook loss dropped well below the value obtained when no additive was used, and with the exception of the pH of cooked sample 5, the pH decreased below the values obtained with TSPP alone.

TABLE X

*Use of TSPP Alone and TSPP Plus One of KAP, SIP, KIP, and AmAP With Cured Ground Beef*

| Phosphate Added | pH Raw | pH Cooked | Percent Cook Loss |
|---|---|---|---|
| 1. No phosphate | 6.69 | 6.50 | 48.8 |
| 2. 0.33% TSPP | 6.75 | 6.81 | 2.0 |
| 3. 0.33% TSPP, 0.15% KAP | 6.72 | 6.71 | 2.7 |
| 4. 0.33% TSPP, 0.33% KAP | 6.59 | 6.49 | 2.6 |
| 5. 0.33% TSPP, 0.15% SIP | 6.71 | 6.82 | 1.4 |
| 6. 0.33% TSPP, 0.33% SIP | 6.75 | 6.78 | 1.2 |
| 7. 0.33% TSPP, 0.15% KIP | 6.68 | 6.63 | 1.4 |
| 8. 0.33% TSPP, 0.33% KIP | 6.54 | 6.55 | 2.1 |
| 9. 0.33% TSPP, 0.15% AmAP | 6.71 | 6.65 | 1.3 |
| 10. 0.33% TSPP, 0.33% AmAP | 6.60 | 6.45 | 2.3 |

The use of TSP alone in the tests shown in Table XI caused the pH of both the raw and cooked cured ground beef to increase to an unacceptable value. The combination of TSPP and SAP showed only a slight increase in pH of the raw mixture and a decrease in pH of the cooked products. The cook loss was excellent in all cases wherein a phosphate was added except at the highest amounts. Even in the latter case an acceptable product resulted. When using 2.0% TSPP alone, the meat turned gray and had a soapy taste.

TABLE XI

*Use of TSPP Alone and TSPP Plus SAP With Cured Ground Beef*

| Phosphate Added | pH Raw | pH Cooked | Percent Cook Loss |
|---|---|---|---|
| 1. No phosphate | 5.89 | 6.09 | 54.0 |
| 2. 0.15% TSPP, 0.15% SAP | 5.98 | 5.85 | 4.5 |
| 3. 0.25% TSPP, 0.25% SAP | 6.09 | 5.89 | 1.0 |
| 4. 0.50% TSPP, 0.50% SAP | 6.19 | 5.81 | 2.5 |
| 5. 0.50% TSPP | 6.52 | 6.31 | 0.5 |
| 6. 1.00% TSPP, 1.00% SAP | 6.29 | 6.08 | 3.0 |
| 7. 2.00% TSPP, 2.00% SAP | 6.22 | 5.79 | 2.5 |
| 8. 2.00% TSPP | 7.79 | 7.35 | 5.5 |
| 9. 4.00% TSPP, 4.00% SAP | 6.09 | 5.99 | 20.5 |

The above tests conclusively show that the combination of an alkali metal polyphosphate and an alkali metal-trivalent metal phosphate in ground meat products, both cured and uncured, fresh or previously frozen, gives an improvement in the control of meat pH and cook loss. In addition, the tests show that ATP alone has a very beneficial effect on certain meat products, particularly those with a high initial pH. The meat products having a high initial pH are known in the trade as "dark cutters." These meats have such a high initial pH that it is generally impossible to add enough of the prior art salts such as TSPP to induce good binding characteristics without giving a resulting pH which is so high that spoilage is promoted and taste is impaired. By the use of SAP alone in such meats, the pH is reduced, the flavor is improved, and good binding results. This meat having a high initial pH may thus be used in ground meat products to produce a product having good color and taste properties and good resistance to bacteriological deterioration.

It should be understood that this invention is not limited to the types of meat samples used for comparative testing in the foregoing examples. The phosphate salts of this invention may be used in the commonly used comminuted meat products which may also include flours, starches, soy protein, caseinates, alginates, carrageenins and other well-known compounding ingredients.

This application is a continuation-in-part of our application, Serial No. 860,340, filed December 18, 1959, now abandoned.

The foregoing detailed description has been given for clearness of understanding only, and no unnecessary limitations should be understood therefrom, as modifications will be obvious to those skilled in the art.

We claim:

1. A composition for treating comminuted meat products comprising an admixture of about 1–15 parts by weight of alkali metal polyphosphate and about 1 part by weight of an alkali metal-trivalent metal phosphate.

2. The composition of claim 1 wherein said composition contains about 1–5 parts by weight alkali metal polyphosphate and about 1 part by weight alkali metal-trivalent metal phosphate.

3. A composition for treating comminuted meat products comprising about 1–15 parts by weight of an alkali metal polyphosphate of the group consisting of alkali metal pyrophosphates and alkali metal tripolyphosphates, and about 1 part by weight of a soluble alkali metal-trivalent metal phosphate complex represented by the formula $$MM'_{3-4}H_{11-17}(PO_4)_{7-10} \cdot O - 8H_2O$$

wherein M is a member of the group consisting of sodium potassium and ammonium and M' is a trivalent metal from the group consisting of iron and aluminum.

4. The composition of claim 3 wherein said composition contains about 1–5 parts by weight alkali metal polyphosphate and about 1 part by weight alkali metal-trivalent metal phosphate.

5. The composition of claim 3 wherein the alkali metal polyphosphate is tetrasodium pyrophosphate and the alkali metal-trivalent metal phosphate is sodium aluminum phosphate.

6. The composition of claim 3 wherein the alkali metal polyphosphate is tetrapotassium pyrophosphate and the alkali metal-trivalent metal phosphate is sodium aluminum phosphate.

7. The composition of claim 3 wherein the alkali metal polyphosphate is sodium tripolyphosphate and the alkali metal-trivalent metal phosphate is sodium aluminum phosphate.

8. The composition of claim 3 wherein the alkali metal polyphosphate is tetrasodium pyrophosphate and the alkali metal-trivalent metal phosphate is potassium aluminum phosphate.

9. The composition of claim 3 wherein the alkali metal polyphosphate is tetrasodium pyrophosphate and the alkali metal-trivalent metal phosphate is sodium iron phosphate.

10. The composition of claim 3 wherein the alkali metal polyphosphate is tetrasodium pyrophosphate and the alkali metal-trivalent metal phosphate is potassium iron phosphate.

11. The composition of claim 3 wherein the alkali metal polyphosphate is tetrasodium pyrophosphate and the alkali metal-trivalent metal phosphate is ammonium aluminum phosphate.

References Cited in the file of this patent
UNITED STATES PATENTS

| | | |
|---|---|---|
| 2,513,094 | Hall | June 27, 1950 |
| 2,876,115 | Epstein | Mar. 3, 1959 |
| 2,888,351 | Olson et al. | May 26, 1959 |